(12) United States Patent
Perdomo et al.

(10) Patent No.: US 8,224,310 B2
(45) Date of Patent: Jul. 17, 2012

(54) METHOD AND SYSTEM FOR MANAGING AN ELECTRONIC DEVICE

(75) Inventors: Jorge L. Perdomo, Boca Raton, FL (US); Michael R. Hand, Boca Raton, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 878 days.

(21) Appl. No.: 11/682,950

(22) Filed: Mar. 7, 2007

(65) Prior Publication Data

US 2008/0113663 A1 May 15, 2008

Related U.S. Application Data

(60) Provisional application No. 60/865,923, filed on Nov. 15, 2006.

(51) Int. Cl.
*H04M 3/00* (2006.01)

(52) U.S. Cl. .......................................................... 455/419

(58) Field of Classification Search .................. 455/418, 455/419, 550.1, 566, 466
See application file for complete search history.

(56) References Cited

U.S. PATENT DOCUMENTS

| | | | |
|---|---|---|---|
| 6,411,828 B1 * | 6/2002 | Lands et al. ............... | 455/569.1 |
| 6,657,595 B1 | 12/2003 | Phillips et al. | |
| 7,437,168 B1 * | 10/2008 | Westfield ................... | 455/456.4 |
| 7,495,687 B2 * | 2/2009 | DuMas et al. ................ | 348/143 |
| 2004/0259591 A1 * | 12/2004 | Grams et al. ............... | 455/556.1 |
| 2005/0108529 A1 * | 5/2005 | Juneau ......................... | 713/168 |
| 2005/0246098 A1 * | 11/2005 | Bergstrom et al. .......... | 701/213 |
| 2006/0005156 A1 * | 1/2006 | Korpipaa et al. ............ | 717/100 |
| 2006/0223553 A1 * | 10/2006 | Reisgies ...................... | 455/466 |
| 2007/0066323 A1 * | 3/2007 | Park et al. ................... | 455/456.2 |
| 2008/0014989 A1 * | 1/2008 | Sandegard et al. .......... | 455/557 |
| 2008/0039212 A1 * | 2/2008 | Ahlgren et al. .............. | 463/46 |

FOREIGN PATENT DOCUMENTS

WO    WO 2006030002 A1    3/2006

OTHER PUBLICATIONS

"Toss it" CHI 2005, Apr. 2-7, 2005, Portland, Oregon, USA. ACM 1-59593-002-7/05/0004.*
M. Ringwald: Spontaneous Interaction with Everyday Devices Using a PDA. Proceedings Workshop on Supporting Spontaneous Interaction in Ubiquitous Computing Settings, Ubicomp 2002, Gothenburg, Sweden, Sep. 2002.*

* cited by examiner

*Primary Examiner* — Nathan Mitchell
(74) *Attorney, Agent, or Firm* — Stephen H. Shaw (57) ABSTRACT

A method and system for managing an electronic device is provided. The method includes detecting (404) a change in orientation of a first electronic device, which is performed by the first electronic device. The method also includes communicating (406) the change in the orientation from the first electronic device to a second electronic device associated with the first electronic device, via a wireless link. Further, the method includes modifying (408) a first set of services available at the second electronic device, based on the change of orientation of the first electronic device.

9 Claims, 6 Drawing Sheets

METHOD AND SYSTEM FOR MANAGING AN ELECTRONIC DEVICE

CROSS-REFERENCE TO RELATED APPLICATION

The present application claims the benefit of U.S. Provisional Application Ser. No. 60/865,923, filed on Nov. 15, 2006, which is incorporated by reference herein.

FIELD OF THE INVENTION

This invention relates in general to electronic devices, and more specifically, to a method and system for managing an electronic device based on the orientation of an associated device via a wireless connection.

BACKGROUND OF THE INVENTION

Electronic devices provide a wide variety of services. Examples of such electronic devices include, but are not limited to, mobile phones, laptop computers, Personal Digital Assistants (PDAs), and pagers. The set of services provided by an electronic device includes a set of operational modes and a set of applications for the electronic device. Examples of the operational modes include, but are not limited to, a 'silent' mode, a 'loud' mode, a 'media' mode, a 'phone' mode, an 'airplane' mode and a 'vibration' mode, among other operating modes. The services available in a particular operational mode may be different from those available in another operational mode. For example, the number of services available in the silent mode can be more or less than the number of services available in the loud mode. The set of applications include, but are not limited to, an email, the Internet, a text editor, and an audio/video playback. The electronic devices can be linked with each other through a wireless link in a communication network. Examples of a wireless link include, but are not limited to, a Wireless Local Area Network (WLAN), a Personal Area Network (PAN) such as a Bluetooth® link, and Radio Frequency Identification (RFID). With improvements in technology, electronic devices can also have one or more functional blocks that are physically separated. These physically separated functional blocks can communicate with each other through wireless links.

The number of services that can be supported by an electronic device is increasing continuously. As a result, it has become difficult for a user of an electronic device to make optimal use of all the services provided by the electronic device. The operational modes can be changed by the user according to the set of services desired by him/her. Generally, it is convenient for the user to have only a limited set of services provided by the electronic device when the electronic device is in a particular operational mode, according to the preferences of the user. To use the desired services, the user needs to manually change the operational mode of the electronic device. However, manually configuring the operational mode, to change the associated services whenever the mode needs to be changed, can be cumbersome for the user.

Currently, there are methods available that improve the user experience in managing the services provided by the electronic device. One of these methods involves sensing the position of the electronic device and modifying the services provided, based on its position. For example, when the user is in a meeting, he/she turns the electronic device in a downward position and the electronic device is configured in the silent mode. In another method, the electronic device is attached to an external case. When the device is attached to the case, a particular set of services are available, and when the device is not attached to the case a different set of services are available. For example, when the user is in a meeting, he/she removes the electronic device from the attached case and the electronic device gets configured into the silent mode.

However, these methods have one or more of the following limitations. These methods are limited to a single electronic device, or electronic devices coupled by wire, where all the services reside on a single electronic device or coupled to a second electronic device. Including all the services in the single electronic device makes it difficult for the user to configure the required set of services, based on the desired operational mode. When different sets of services are provided by the different physically separated functional blocks of an electronic device, the integration of the disparate services and their corresponding applications can make user interaction with the electronic device inefficient.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of various embodiments of the present invention.

DETAILED DESCRIPTION

Before describing in detail the particular method and system for managing an electronic device, in accordance with the present invention, it should be observed that the present invention resides primarily in combinations of method steps and apparatus components related to a method and system for managing an electronic device. Accordingly, the apparatus components and method steps have been represented where appropriate by conventional symbols in the drawings, showing only those specific details that are pertinent for an understanding of the present invention, so as not to obscure the disclosure with details that will be readily apparent to those with ordinary skill in the art, having the benefit of the description herein.

Terms such as 'comprises,' 'comprising,' 'includes,' including,' or any other variation thereof, are intended to cover a non-exclusive inclusion, such that a process, method, article or apparatus that comprises a list of elements does not include only those elements but may include other elements not expressly listed or inherent to such a process, method, article or apparatus. An element proceeded by "comprises . . . a", does not, without more constraints, preclude the existence of additional identical elements in the process, method, article or apparatus that comprises the element. The term "another", as used herein, is defined as at least a second or more. The terms "including" and/or "having", as used herein, are defined as comprising.

In an embodiment, a method of managing a plurality of electronic devices is provided. The method includes detecting a change in orientation of a first electronic device. The detection is performed by the first electronic device. The method also includes communicating the change in orientation from the first electronic device to a second electronic device associated with the first electronic device via a wireless link. Further, the method includes modifying a first set of services available at the second electronic device, based on the change of orientation of the first electronic device.

In another embodiment of, a first electronic device is provided. The first electronic device includes a receiver and a processor. The receiver is configured to receive a signal based on a change in orientation of a second electronic device. The processor is operatively coupled with the receiver. The processor is configured to modify a set of services available with the first electronic device based on the signal.

Figure 1:
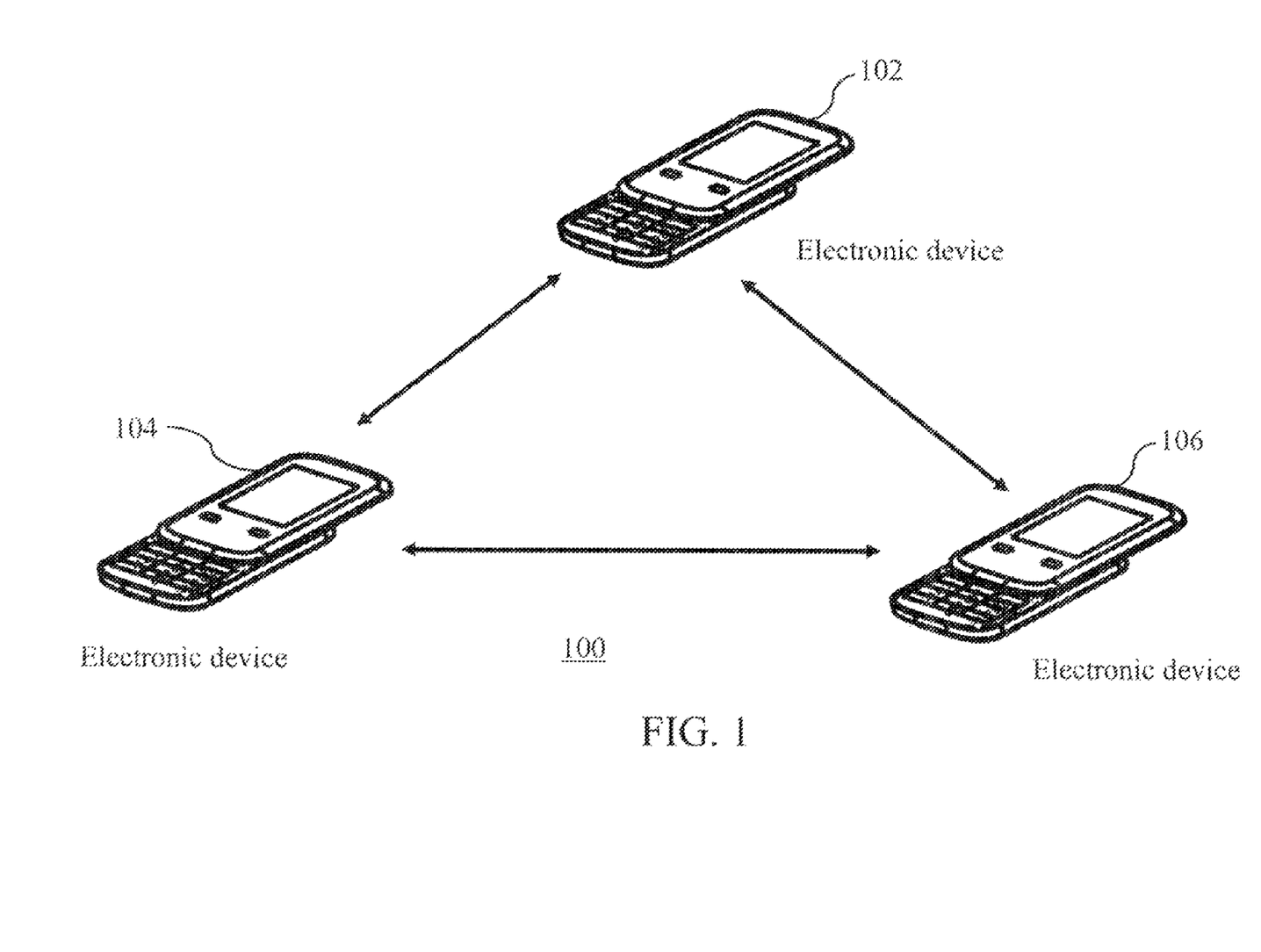
FIG. 1 illustrates an exemplary communication network where various embodiments of the present invention can be practiced.

FIG. 1 illustrates an exemplary communication network 100, where various embodiments of the present invention can be practiced. The communication network 100 includes electronic devices 102, 104 and 106. Examples of the electronic devices 102, 104 and 106 include, but are not limited to, a mobile phone, a laptop, a Personal Digital Assistant (PDA), and a pager. Although the communication network 100 is shown to include only the electronic devices 102, 104 and 106 in FIG. 1, it will be apparent to one skilled in the art that the communication network 100 can include more or fewer electronic devices, as shown in FIG. 1. The electronic devices 102, 104 and 106 are connected to each other via a wireless link. Examples of the wireless links include, but are not limited to, Wireless Local Area Networks (WLANs), Zigbee, 802.11, the Infrared, PANs, MOTOTALK, the Bluetooth® and Radio Frequency Identification (RFID). In another embodiment, the electronic devices 102, 104 and 106 are connected via an electrical connection or a mechanical connection.

Each of the electronic devices 102, 104 and 106 can provide a set of services. The set of services includes a set of operational modes for an electronic device, for example, the electronic device 102, and a set of applications for the electronic device 102. Examples of operational modes include, but are not limited to, a silent mode, loud mode and vibration mode. A set of services available in a particular operational mode, for example, the silent mode, may be disabled in another operational mode, for example, the loud mode. In an embodiment, the operational modes also include the modes of communication provided by the electronic device. Examples of communication technologies include, but are not limited to, Global Standard for Mobiles (GSM), Wireless Local Area Network (WLAN), Worldwide Interoperability for Microwave Access (WiMAX), Personal Area Network (PAN) and Code Division Multiple Access (CDMA). The set of applications include, but are not limited to, emails, web browsers, Java applications, text messaging, calendars, voice notes, image capturers/viewers, audio players, games, voice mails, word processors, spreadsheets and Short Messaging Service (SMS). The operational modes determine the set of services desired by the user of the electronic device, for example, the electronic device 102. These operational modes can be changed by the user according to the set of services desired by him/her.

The set of services available with an electronic device, for example, the electronic device 104, can be modified, based on the change in the orientation of another electronic device, for example, the electronic device 102. Similarly, a set of services available with the electronic device 102 can be based on the change in the orientation of the electronic device 104. In another embodiment, more than one set of services present in different electronic devices can be modified, based on the change in the orientation of a particular electronic device when the electronic device is connected via a wireless link to the different electronic devices.

Figure 2:
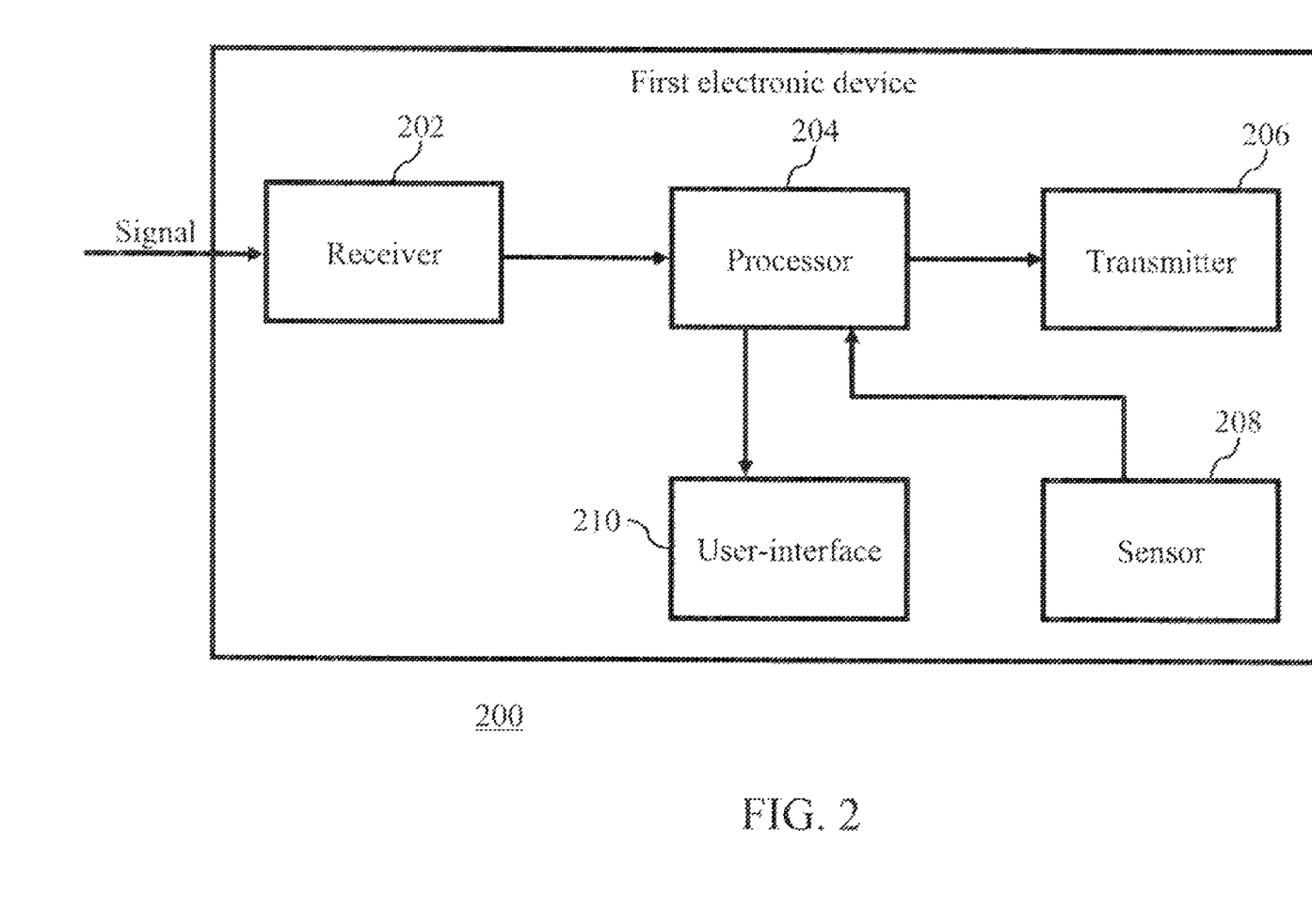
FIG. 2 illustrates a block diagram of an electronic device, in accordance with an embodiment of the present invention.

FIG. 2 illustrates a block diagram of the electronic device 200, herein-after referred to as the first electronic device 200, in accordance with an embodiment of the present invention. The first electronic device 200 includes a receiver 202 and a processor 204. The receiver 202 is configured to receive a signal, based on a change in the orientation of a second electronic device, for example, the electronic device 102. In an embodiment, the signal includes information about the change in the orientation of the electronic device 102. The receiver 202 is operatively coupled with the processor 204. The receiver 202 provides the received signal to the processor 204 for further processing of the received signal. The processor 204 modifies a set of services available with the first electronic device 200, based on the received signal. The processor 204 enables a particular set of services and disables another set of services, to modify the set of services available with the first electronic device 200. The processor 204 operates by execution of instruction code stored in a memory of the first electronic device 200. The instruction code is designed to cause the operation described herein, as is common in the art. By saying the processor 204 is configured to perform a given task, it is meant that instruction code executed by the processor 204 results in the described operation. In an embodiment, the processor 204 is further configured to generate an alert signal, based on the modified set of services. Examples of an alert signal include, but are not limited to, an audio signal, a video signal, an audio-video signal and a tactile signal. The alert signal can be used to notify a user when the set of services is modified. For example, when the user of the electronic device 102 moves from an office area governed by a WLAN to an area governed by a GSM network, the user can change the orientation of the electronic device 102. As a result, the operational mode of the first electronic device 200 is changed to an operational mode that is suitable for the GSM network. To notify the change in the operational mode, an audio signal, for example, a beep is generated to notify the user of the first electronic device 200.

In an embodiment, the first electronic device 200 also includes a transmitter 206. The transmitter 206 is operatively coupled to the processor 204. The transmitter 206 is configured to transmit a signal to the electronic device 102, to communicate the change in the orientation of the first electronic device 200. For example, when the user of the first electronic device 200 changes the orientation of the first electronic device 200, the transmitter 206 can transmit the signal, based on the change in the orientation of the first electronic device 200, to the electronic device 102.

In another embodiment, the first electronic device 200 includes a sensor 208. The sensor 208 is operatively coupled with the processor 204. The sensor 208 is configured to detect the change in the orientation of the first electronic device 200. The sensor 208 provides information about the change in the orientation of the first electronic device 200 to the processor

204. Examples of the sensor 208 include, but are not limited to, an electronic sensor, a mechanical sensor, an electro-mechanical sensor, an electro-magnetic sensor, an accelerometer, a hall-effect switch/sensor, as well as combinations of such sensors. Further, the processor 204 processes the information about the change in the orientation of the first electronic device 200, to generate a corresponding signal. The processor 204 provides the signal to the transmitter 206. In an embodiment, the transmitter 206 transmits the signal to the electronic device 102 in an encoded form.

In an embodiment, the change in the orientation of the first electronic device 200 can be performed by the user of the first electronic device 200. For example, when the user wants to modify a set of services available with the electronic device 102, the user can rotate the first electronic device 200 by 90 degrees horizontally, based on a pre-defined reference position. The change in the orientation of the first electronic device 200 is measured with respect to the pre-defined reference position. The pre-defined reference position is based on the geometrical features of the first electronic device 200, which include the shape and size of the first electronic device 200. Examples of the shape include, but are not limited to, a square shape, a rectangular shape, a pentagonal shape and a hexagonal shape.

Further, the set of services includes a set of operational modes for the first electronic device 200 and a set of applications, hereinafter referred to as the application features for the first electronic device 200. Examples of the operational modes include, but are not limited to, a silent mode, a loud mode, a media mode, a phone mode, an airplane mode, and a vibration mode. A set of services available in an operational mode, for example, the loud mode, may be disabled in another operational mode, for example, the silent mode. In an embodiment, the operational modes also include the modes of communication of the first electronic device 200. Examples of the communication technologies include, but are not limited to, GSM, WLAN, WiMAX and CDMA. The set of applications include, but are not limited to, emails, web browsers, Java applications, text messaging, calendars, voice notes, image capturers/viewers, audio players, games, voice mails, word processors, spreadsheets and SMS.

In an embodiment, the first electronic device 200 also includes a user-interface 210. The user-interface 210 displays a list of the modified set of services available with the first electronic device 200. For example, before modification, the user-interface 210 displays a list of services that are defined in the silent mode. The list of services includes application features such as emails, SMS, web browsers, and calendars. When the operational mode is changed to loud mode, the modified list of services available with the first electronic device 200 in the loud mode is displayed by the user-interface 210. The list of services displayed in the loud mode can include application features such as but not limited to an incoming call alert, voice mail, a contact list and voice mail.

Figure 3:
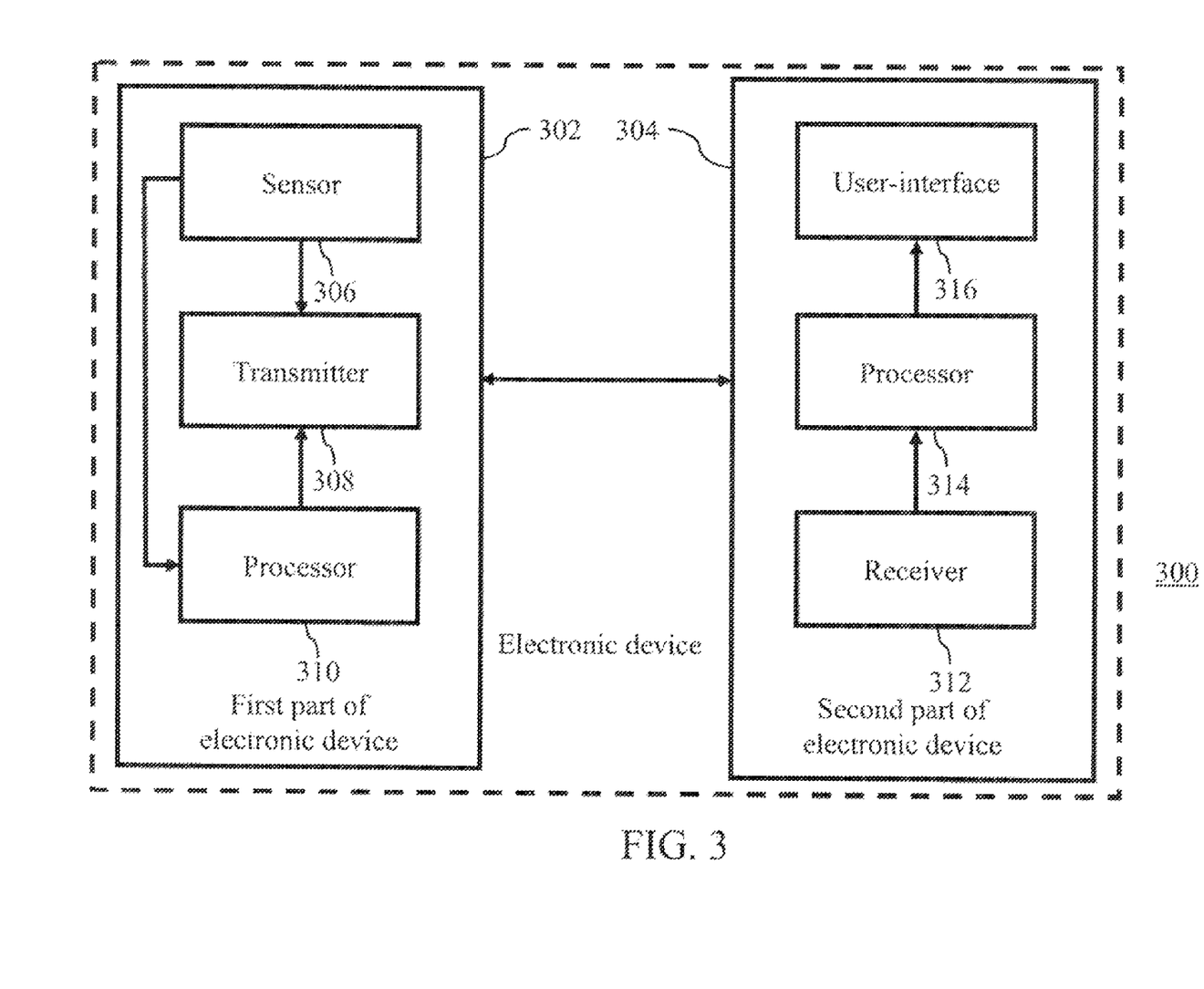
FIG. 3 illustrates a block diagram of an electronic device, in accordance with another embodiment of the present invention.

FIG. 3 illustrates a block diagram of the electronic device 300, in accordance with another embodiment of the present invention. The electronic device 300 includes a first part 302 of the electronic device 300 and a second part 304 of the electronic device 300. The first part 302 is communicably coupled to the second part 304 via a wireless link. In another embodiment, the first part 302 and the second part 304 can be communicably coupled by an electrical or mechanical connection. For example, the first part 302 can be a Bluetooth® headset worn by the user, and the second part 304 can be a mobile phone. Different sets of services can be available with the first part 302 and the second part 304.

A first set of services is available with the first part 302. The first set of services includes a set of operational modes for the first part 302 and a set of applications, hereinafter referred to as application features, for the first part 302. Similarly, a second set of services is available with the second part 304. The second set of services includes a set of operational modes for the second part 304 and a set of applications, hereinafter referred to as application features, for the second part 304. Examples of the operational modes include, but are not limited to, a silent mode, a loud mode, and a vibration mode. A set of services available with an operational mode, for example, the loud mode, may be disabled in another operational mode, for example, the vibration mode. In an embodiment, the operational modes also include the modes of communication. Examples of the communication technologies include, but are not limited to, GSM, WLAN, PAN, WiMAX, MOTOTALK and CDMA. The set of applications include, but are not limited to, emails, web browsers, Java applications, text messaging, calendars, voice notes, image capturers/viewers, audio players, games, voice mails, word processors, spreadsheets and SMS.

The first part 302 includes a sensor 306 and a transmitter 308. The sensor 306 is operatively coupled with the transmitter 308. The sensor 306 is configured to detect a change in the orientation of the first part 302. The change in the orientation can be performed by the user of the first part 302. Examples of the sensor 306 include, but are not limited to, an electronic sensor, a mechanical sensor, an electro-mechanical sensor and an electro-magnetic sensor. In one embodiment, the sensor 306 is a hall-effect switch/sensor. The sensor 306 provides the transmitter 308 with information regarding the change in the orientation of the first part 302. The change in the orientation of the first part 302 is based on a pre-defined reference position, which is based on the geometrical features of the first part 302. The geometrical features of the first part 302 include the shape and the size of the first part 302. Examples of the shapes include, but are not limited to, a square shape, a rectangular shape, a pentagonal shape and a hexagonal shape. In one embodiment, the transmitter 308 encodes a signal, based on the change in the orientation of the first part 302, and transmits the signal to the second part 304. In an embodiment, the first part 302 includes a processor 310. The sensor 306 provides the processor 310 with information pertaining to the change in the orientation of the first part 302. The processor 310 processes the information to generate the signal, based on the change in the orientation of the first part 302. The processor 310 also provides the signal to the transmitter 308. The transmitter 308 then transmits the signal to the second part 304.

The second part 304 includes a receiver 312 and a processor 314. The receiver 312 is operatively coupled with the processor 314. The receiver 312 is configured to receive the signal from the first part 302. In an embodiment, the receiver 312 decodes the signal containing information about the change in the orientation of the first part 302. The decoded signal is provided to the processor 314. The processor 314 is configured to modify a second set of services available with the second part 304, based on the signal provided by the receiver 312. The processor 314 enables a particular set of services and disables another set of services, to modify the second set of services. In an embodiment, the processor 314 is configured to generate an alert signal, based on the modified second set of services available with the second part 304. Examples of an alert signal include, but are not limited to, an audio signal, a video signal, an audio-video signal and a tactile signal. The alert signal can be used to notify a user when the second set of services available with the second part 304 is modified. For example, when the second set of services available with the second part 304 is modified, an audio alert can be generated to notify the user of the second part 304.

Figure 4:
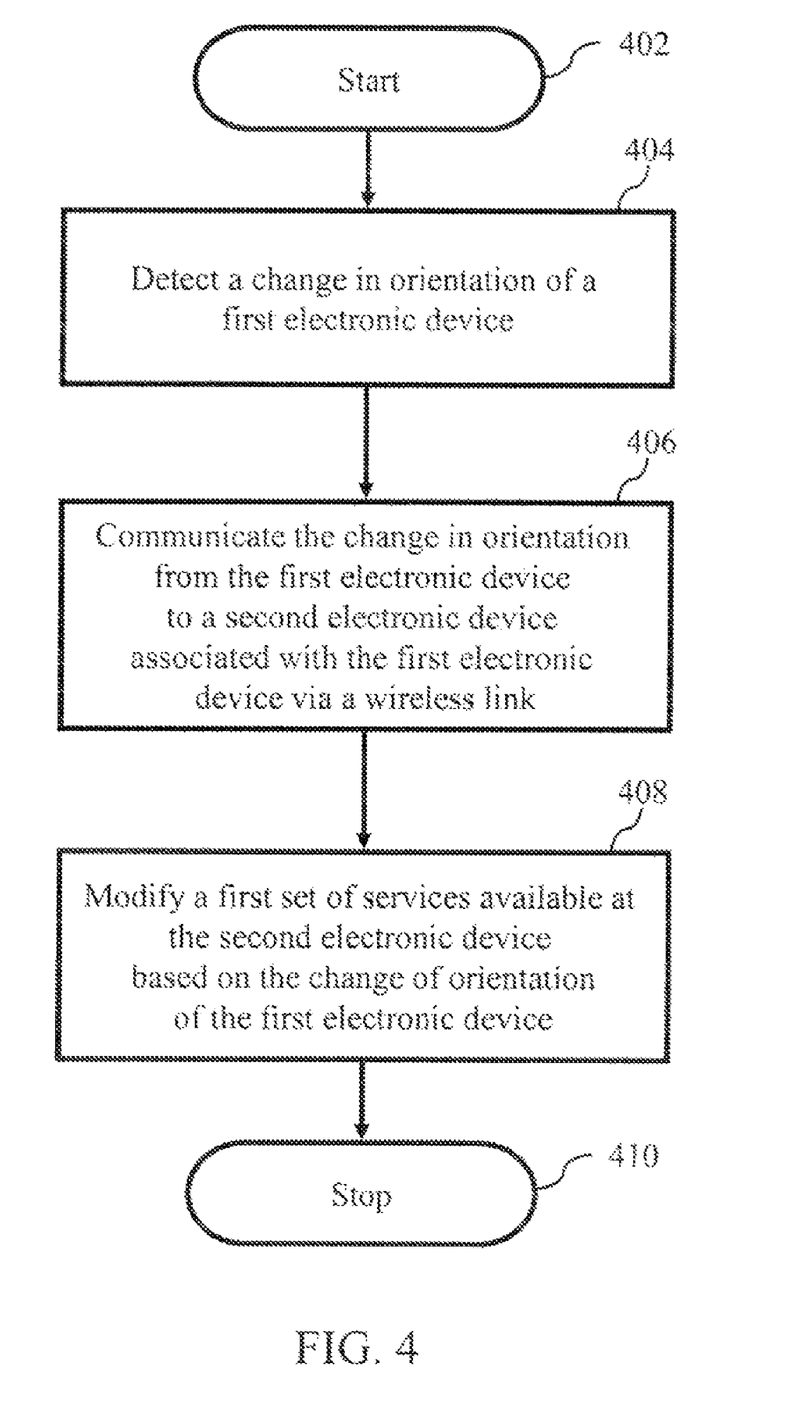
FIG. 4 is a flow diagram illustrating a method of managing a plurality of electronic devices, in accordance with an embodiment of the present invention.

In an embodiment, the second part 304 includes a user-interface 316. The user-interface 316 displays a list of the modified second set of services available with the second part 304. For example, before modification, the user-interface 316 displays a list of services defined by the loud mode. The list of services includes application features such as an incoming call alert, voice mail, a contact list, and a voice mail. When the operational mode is changed to, for example, the silent mode, the modified second set of services available with the second part 304 in the silent mode is displayed by the user-interface 316. The list of services displayed in the silent mode includes application features such as email, SMS, the Internet, and a calendar FIG. 4 is a flow diagram illustrating a method of managing a plurality of electronic devices, in accordance with an embodiment of the present invention. To describe the method, reference will be made to FIG. 1, although it is understood that the method can be implemented with reference to any other suitable embodiment of the present invention. At step 402, a method for managing a plurality of electronic devices is initiated. At step 404, a change in the orientation of a first electronic device is detected. The detection is performed by the first electronic device. For example, when a user of the electronic device 102 changes the orientation of the electronic device 102, the change in the orientation is detected by the electronic device 102.

At step 406, the change in the orientation is communicated from the first electronic device to a second electronic device. The second electronic device is associated with the first electronic device via a wireless link. For example, the change in the orientation of the electronic device 102 is communicated from the electronic device 102 to the electronic device 104. Examples of the wireless link protocols include, but are not limited to, WLAN protocol, PAN protocols, the Bluetooth®, Near Field Communication (NFC) protocols and RFID protocols. The change in the orientation of the first electronic device is communicated from the first electronic device to the second electronic device by transmitting a signal, based on the change in the orientation of the first electronic device.

At step 408, a first set of services available at the second electronic device is modified. The first set of services is modified by the second electronic device, based on the change in orientation of the first electronic device. For example, the set of services available at the electronic device 104 is modified by the electronic device 104, based on the change in the orientation of the electronic device 102. At step 410, the method for managing a plurality of electronic devices is terminated.

Figure 5:
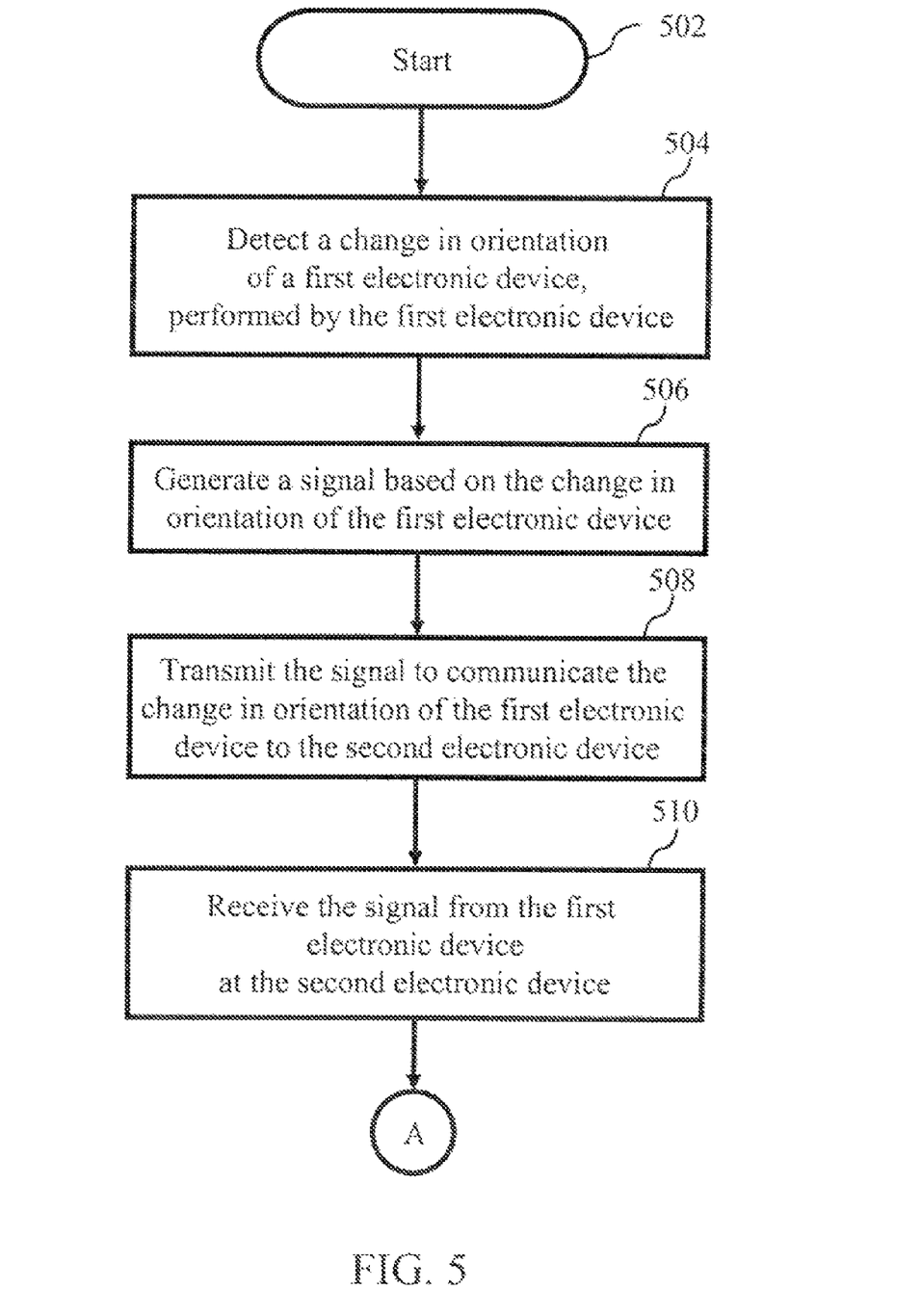
FIGS. 5 and 6 is a flow diagram illustrating a method of managing a plurality of electronic devices, in accordance with another embodiment of the present invention.
Figure 6:
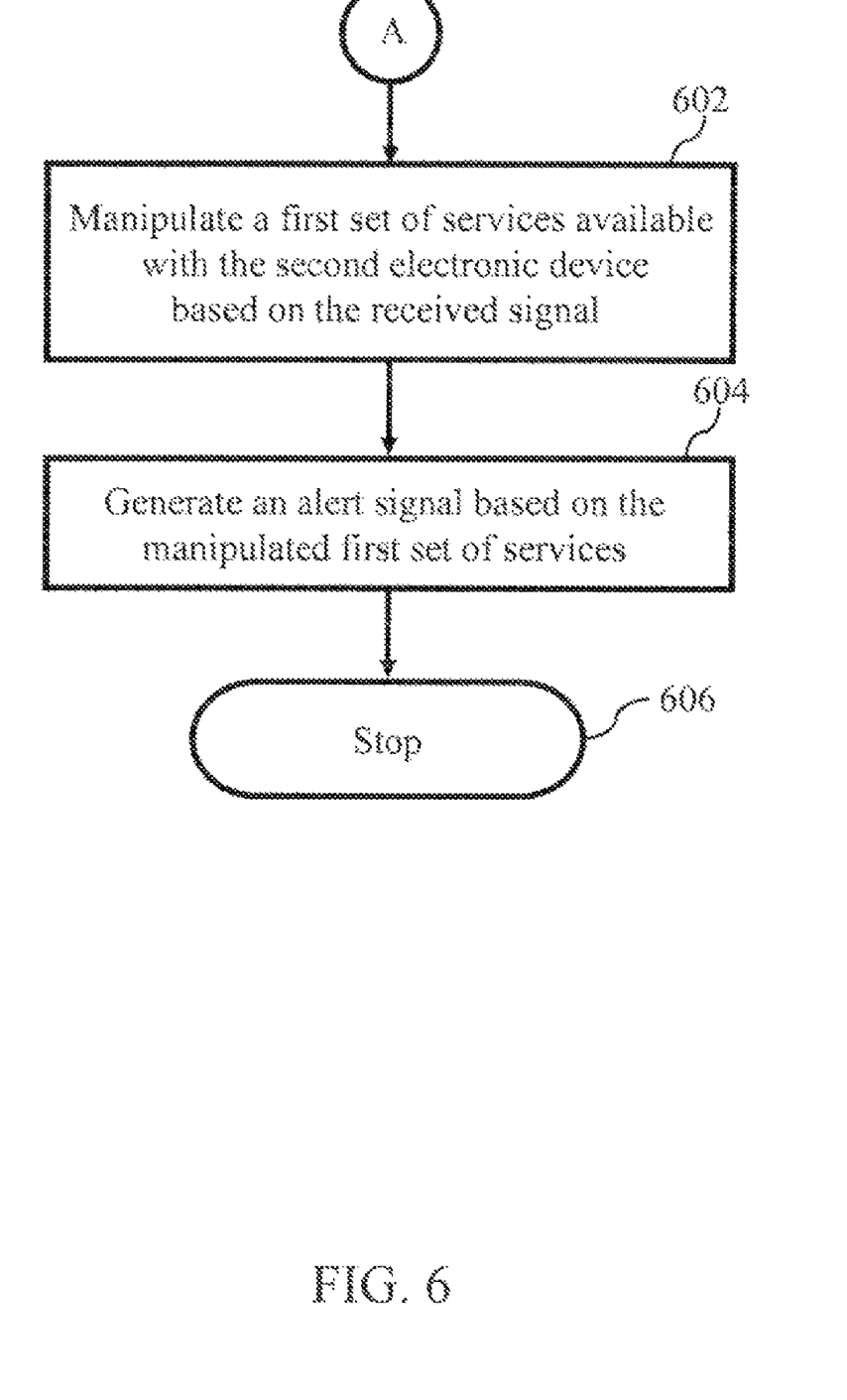

FIGS. 5 and 6 is a flow diagram illustrating a method of managing a plurality of electronic devices, in accordance with another embodiment of the present invention. To describe the method, reference will be made to FIGS. 1 and 2, although it is understood that the method can be implemented in any other suitable embodiment of the present invention. Further, the method can have a greater or fewer numbers of steps than shown in FIGS. 5 and 6.

At step 502, a method for managing a plurality of electronic devices is initiated. At step 504, a change in the orientation of a first electronic device is detected. The detection is performed by the first electronic device. For example, when a user of the electronic device 102 changes the orientation of the electronic device 102, the change in the orientation is detected by the electronic device 102. Detecting the change in the orientation of the electronic device 102 is performed with respect to a pre-defined reference position. The pre-defined reference position is based on the geometrical features of the electronic device 102, which include the shape and size of the electronic device 102. Examples of the shape include, but are not limited to, a square shape, a rectangular shape, a pentagonal shape and a hexagonal shape.

At step 506, a signal containing information about the change in the orientation of the first electronic device is generated at the first electronic device, based on the change in the orientation of the first electronic device. For example, when there is a change in the orientation of the electronic device 102, a signal containing information about the change in orientation of the electronic device 102 is generated.

At step 508, the signal is transmitted from the first electronic device to a second electronic device, to communicate the change in the orientation of the first electronic device. For example, the electronic device 102 transmits the signal to the electronic device 104, to communicate the change in the orientation of the electronic device 102. In an embodiment, the signal is encoded and transmitted via a wireless link.

At step 510, the signal containing information about the change in the orientation of the first electronic device is received at the second electronic device. For example, the signal containing information about the change in the orientation of the electronic device 102 is received at the electronic device 104. In an embodiment, the signal is received in an encoded form. The signal containing information about the change in the orientation of the first electronic device is decoded at the second electronic device. For example, the signal containing information about the change in the orientation of the electronic device 102 is decoded at the electronic device 104.

At step 602, a first set of services available with the second electronic device is manipulated, based on the received signal. For example, a set of services available with the electronic device 104 is manipulated, based on the received signal. The received signal is based on the change in the orientation of the electronic device 102. The user can define the set of services for the electronic device 104, which are to be associated with a particular orientation of the electronic device 102.

The first set of services available with the second electronic device includes a set of operational modes for the second electronic device and a set of application features for the second electronic device. The operational modes determine one or more application features desired by the user of the second electronic device, among the set of application features available with the second electronic device. Examples of the operational modes include, but are not limited to, the silent mode, the loud mode and the vibration mode. A set of services available in an operational mode, for example, the loud mode, may be disabled in another operational mode, for example, the silent mode. In an embodiment, the operational modes also include the modes of communication of the second electronic device. Examples of the communication technologies include, but are not limited to, GSM, WLAN, WiMAX, PAN and CDMA. The set of applications include, but are not limited to, emails, web browsers, Java applications, text messaging, calendars, voice notes, image capturers/viewers, audio players, games, voice mails, word processors, spreadsheets and SMS.

At step 604, an alert signal is generated based on the manipulated first set of services available with the second electronic device. For example, an alert signal is generated based on the manipulated set of services available with the electronic device 104. Examples of the alert signal include, but are not limited to, an audio signal, a video signal, an audio-video signal and a tactile signal. In an embodiment, the alert signal can be used to notify a user about the modification of the set of services available with the electronic device 104. For example, when the user of the electronic device 102 moves from an office area that is covered by a WLAN network to an area that is covered by a GSM network, the user can change the orientation of the electronic device 102. As a result, the operational mode of the electronic device 104 is changed to an operational mode that is suitable for the GSM network. In addition, the electronic device 104 generates a beep to notify the user about this change. At step 606, the method is terminated.

Various embodiments of the present invention provide a method and system for managing an electronic device. The electronic device can detect a change in orientation of another electronic device that is wirelessly linked to the electronic device. This change in the orientation is communicated to the electronic device through the wireless link in the form of a signal. The set of services provided by the electronic can be modified based on the signal. In some cases, the electronic device can have two or more parts that are physically separated and provide different sets of services. These parts are wirelessly linked with each other. A change in orientation of one part can be detected by another part. The set of services provided by the other part can be modified based on this change in the orientation. As a result, the user need not have all the services in a single electronic device, which makes it convenient for him/her to manage the electronic device. For example, when the user of an electronic device, for example, a mobile phone, does not wish to receive voice calls but can accept text messages, the user can change the orientation of another electronic device, for example, a Bluetooth® headset wirelessly linked to the mobile phone, in a predefined position. This implies that the user does not need to manually configure the set of services required by him/her at different times and can manage the device by changing the orientation of another electronic device. This improves the overall user experience in managing an electronic device and optimizes the use of various services provided by the electronic device.

In the foregoing specification, the invention and its benefits and advantages have been described with reference to specific embodiments. However, one with ordinary skill in the art would appreciate that various modifications and changes can be made without departing from the scope of the present invention, as set forth in the following claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. A method of managing a plurality of electronic devices, the method comprising:

detecting a change in orientation of a laptop, performed by the laptop; communicating the change in orientation from the laptop to a mobile phone associated with the laptop via a wireless link; and modifying a first set of services available at the mobile phone based on the change of orientation of the laptop; wherein modification of the first set of services includes enabling some services and disabling other services and wherein the set of services includes a set of operational modes and a set of application features for the mobile phone.

2. The method as recited in claim 1 further comprising:
generating a signal based on the change in the orientation; and
transmitting the signal to the mobile phone.

3. The method as recited in claim 1, wherein modifying the first set of services comprises:
receiving a signal from the laptop, wherein the signal is based on the change in the orientation of the laptop; and
manipulating the first set of services available with the mobile phone based on the signal.

4. The method as recited in claim 3 further comprising:
generating an alert signal based on the manipulated first set of services.

5. The method as recited in claim 4, wherein the alert signal is at least one of an audio signal, a video signal, an audio-video signal and a tactile signal.

6. A laptop comprising:
a first part, wherein the first part comprises:
a sensor configured to detect a change in orientation of the first part, performed by the first part; and
a transmitter configured to transmit a signal to communicate the change in orientation in the first part to a second part of the laptop, wherein a first set of services is available with the first part; and
the second part communicably coupled to the first part, wherein the second part comprises:
a receiver configured to receive the signal from the first part; and
a processor configured to modify a second set of services available with the second part based on the signal; wherein modification of the second set of services includes enabling some services and disabling other services.

7. The electronic device as recited in claim 6, wherein the sensor is at least one of an electronic sensor, a mechanical sensor, an electro-mechanical sensor and an electro-magnetic sensor.

8. The electronic device as recited in claim 6, wherein the processor modifies the second set of services available with a second part of the laptop based on the signal received from a first part of the laptop.

9. The electronic device claimed in claim 8, wherein the second part of the laptop further comprises a mobile phone communicatively coupled to the laptop such that the processor modifies the second set of services available at the mobile phone based on the change of orientation of the laptop.

* * * * *